(12) United States Patent
Ii

(10) Patent No.: US 7,529,420 B2
(45) Date of Patent: May 5, 2009

(54) METHOD OF DISPLAYING A THUMBNAIL IMAGE, SERVER COMPUTER, AND CLIENT COMPUTER

(75) Inventor: Yasuhiro Ii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 800 days.

(21) Appl. No.: 10/734,480

(22) Filed: Dec. 12, 2003

(65) Prior Publication Data

US 2004/0165789 A1 Aug. 26, 2004

(30) Foreign Application Priority Data

Dec. 13, 2002 (JP) .............................. 2002-361734

(51) Int. Cl.
*G06K 9/36* (2006.01)
*G06K 9/46* (2006.01)
*H04N 7/12* (2006.01)
*H04N 11/02* (2006.01)
*H04N 11/04* (2006.01)

(52) U.S. Cl. .................... 382/240; 382/248; 348/395.1; 375/240.19

(58) Field of Classification Search ................. 382/166, 382/240, 248, 299; 348/395.1, 403.1; 375/240.19
See application file for complete search history.

(56) References Cited

U.S. PATENT DOCUMENTS

| | | | | |
|---|---|---|---|---|
| 5,568,269 A * | 10/1996 | Jamzadeh | .................. | 358/3.07 |
| 5,666,161 A | 9/1997 | Kohiyama et al. | | |
| 5,956,470 A * | 9/1999 | Eschbach | .................... | 358/1.9 |
| 6,020,920 A * | 2/2000 | Anderson | ................ | 348/222.1 |
| 6,134,017 A * | 10/2000 | Schlank et al. | ............. | 358/1.15 |
| 6,549,674 B1 * | 4/2003 | Chui et al. | .................. | 382/240 |
| 6,708,309 B1 * | 3/2004 | Blumberg | .................. | 715/530 |
| 6,967,675 B1 * | 11/2005 | Ito et al. | .................. | 348/207.1 |
| 7,075,550 B2 * | 7/2006 | Bonadio | ..................... | 345/589 |
| 7,127,673 B2 * | 10/2006 | Iwata et al. | ................. | 715/517 |
| 7,206,804 B1 * | 4/2007 | Deshpande et al. | ......... | 709/203 |
| 7,251,790 B1 * | 7/2007 | Drucker et al. | ............. | 715/838 |
| 2002/0057281 A1 * | 5/2002 | Moroo et al. | ............... | 345/668 |
| 2002/0089549 A1 * | 7/2002 | Munro et al. | ............... | 345/835 |
| 2002/0146123 A1 * | 10/2002 | Tian | .......................... | 380/234 |
| 2003/0080977 A1 * | 5/2003 | Scott et al. | ................... | 345/629 |

FOREIGN PATENT DOCUMENTS

JP 2001128109 A * 5/2001

OTHER PUBLICATIONS

Cohen, H.A. ("Proposal for JPEG: Thumbnail-based image access/retrieval," SPIE vol. 2952, 1996, pp. 676-682).*
Björk et al. ("WEST: A web browser for small terminals", CHI Letters, vol. 1, 1, (1999), pp. 187-196).*

* cited by examiner

*Primary Examiner*—Yubin Hung
(74) *Attorney, Agent, or Firm*—Blakely, Sokoloff, Taylor & Zafman LLP

(57) ABSTRACT

A method of displaying a thumbnail image of the original image of a data file stored in a storage unit on a display unit includes: (a) storing in the storage unit a first compressed code relating to an image for displaying the thumbnail image of the data file, the first compressed code being generated by dividing the image into a plurality of tiles and performing discrete wavelet transform and hierarchical encoding on the pixel values of the image tile by tile; (b) setting the resolution of the thumbnail image in accordance with the format type of the data file; (c) extracting a second compressed code according to the resolution that was set from the first compressed code stored in the storage unit; and (d) displaying the thumbnail image based on the second compressed code that was extracted.

16 Claims, 15 Drawing Sheets

PRIOR ART

FIG.3
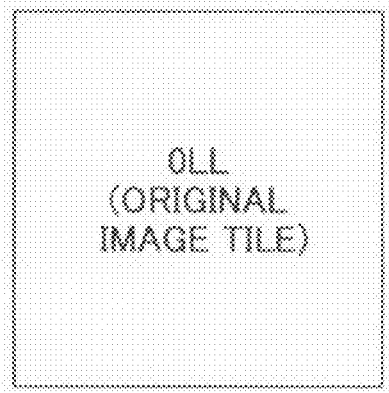
DECOMPOSITION_LEVEL_0
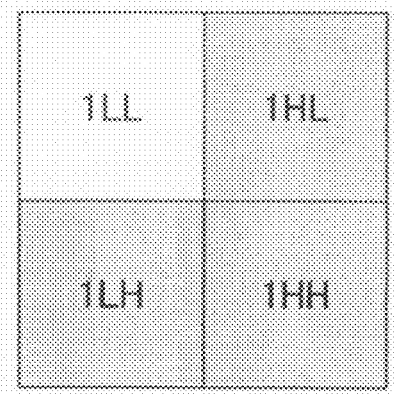
DECOMPOSITION_LEVEL_1
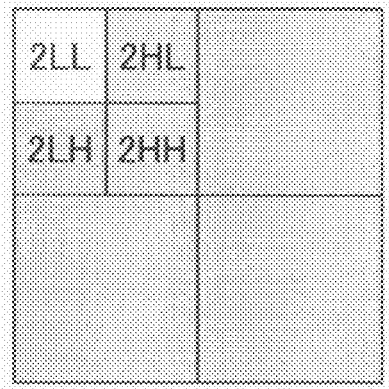
DECOMPOSITION_LEVEL_2
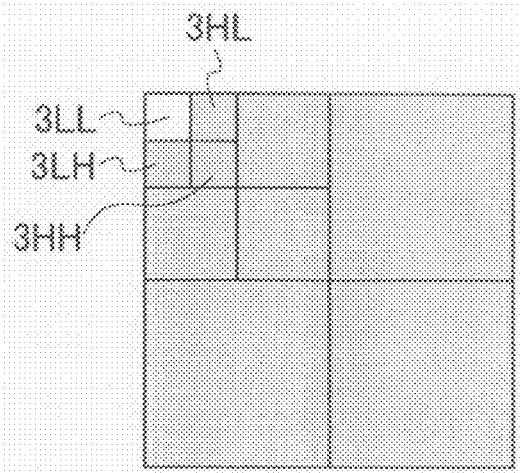
DECOMPOSITION_LEVEL_3
PRIOR ART

FIG.9

| 00 | 01 | 02 | 03 | 04 |
|----|----|----|----|----|
| 10 | 11 | 12 | 13 | 14 |
| 20 | 21 | 22 | 23 | 24 |
| 30 | 31 | 32 | 33 | 34 |
| 40 | 41 | 42 | 43 | 44 |
| 50 | 51 | 52 | 53 | 54 |

FIG.10

| SOC | MH | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 | 50 | 51 | 52 | 53 | 54 | EOC |

METHOD OF DISPLAYING A THUMBNAIL IMAGE, SERVER COMPUTER, AND CLIENT COMPUTER

The present application claims priority to the corresponding Japanese Application No. 2002-361734, filed on Dec. 13, 2002, the entire contents of which are hereby incorporated by reference.

BACKGROUND OF THE INVENTION

1. Field of the Invention

The present invention relates to a method of displaying a thumbnail image, a server computer, and a client computer.

2. Description of the Related Art

According to a file server or a document management system of a client/server model, data files of a variety of formats are mixed up and stored on the server computer side. A client computer accesses the server computer as required to receive and display the image or document data of a desired data file.

Client computers of such a document management system display a list of image or document data files stored in the server computer on a display unit such as a CRT (cathode ray tube) display or an LCD (liquid crystal display).

For instance, such client computers may employ a function referred to as a thumbnail display function or an icon display function to display a list of image or document data files stored in the server computer. The thumbnail display function displays a miniature version of the image data of a data file stored in the server computer or an image into which the document data of a data file stored in the server computer is converted. The icon display function displays icons according to the types of data files. Particularly, the thumbnail display function has the advantage that the contents of all or part of the image or document data of data files stored in the server computer can be recognized at a glance.

The thumbnail display function, however, also has the following disadvantages.

First, the thumbnail display function requires a greater display area per data file than other display methods such as the icon display function. Accordingly, the number of data files displayable on one screen is limited.

More specifically, according to the thumbnail display function, generally, an image dedicated to thumbnail display (for instance, a 128×128-pixel JPEG image) is created and stored independent of a data file. In the case of performing thumbnail display for the data file, the dedicated thumbnail image is displayed, thereby increasing display speed. However, some users desire to increase the number of data files displayable on a screen by reducing the size of a thumbnail image. Meanwhile, other users are even willing to limit the number of data files displayable on a screen in order to see the contents of all or part of the image or document data of data files displayed in a list with larger images.

The technique of forming an image dedicated to thumbnail display of any size by enlarging or reducing the original image at the time of thumbnail display and the technique of previously forming and storing images dedicated to thumbnail display of a plurality of sizes separately from a data file are well known methods for solving the above-described problem, for instance. However, the former technique requires a large memory capacity and a large amount of calculation time for size reduction to form a thumbnail image. The latter technique consumes a large memory capacity in order to store a plurality of dedicated thumbnail images.

Second, according to the thumbnail display function, there is a difference in visibility among the images of data files displayed in a list depending on the types of the data files. For instance, a thumbnail image that shows an overall image may be satisfactory for a data file containing a picture image. However, thumbnail display produces little effect for data files containing, for instance, documents of a fixed format because their overall images are the same in thumbnail display.

SUMMARY OF THE INVENTION

A method of displaying a thumbnail image is described. In one embodiment, the method comprises: storing in the storage unit a first compressed code relating to an image for displaying the thumbnail image of the data file, where the first compressed code is generated by dividing the image into a plurality of tiles and performing discrete wavelet transform and hierarchical encoding on pixel values of the image tile by tile. The method also comprises setting a resolution of the thumbnail image in accordance with a format type of the data file, extracting a second compressed code, according to the resolution, from the first compressed code stored in the storage unit, and displaying the thumbnail image based on the second compressed code extracted.

BRIEF DESCRIPTION OF THE DRAWINGS

Other embodiments of the present invention will become more apparent from the following detailed description when read in conjunction with the accompanying drawings, in which:

FIG. 3 is a diagram illustrating sub-bands at each decomposition level when the number of decomposition levels is three according to JPEG2000;

FIG. 9 is a diagram showing an image divided two-dimensionally according to one embodiment of the present invention;

FIG. 10 is a diagram showing a compressed code generated in accordance with the JPEG2000 algorithm based on the divided image of FIG. 9 according to one embodiment of the present invention;

DETAILED DESCRIPTION OF THE PREFERRED EMBODIMENTS

Figure 1:
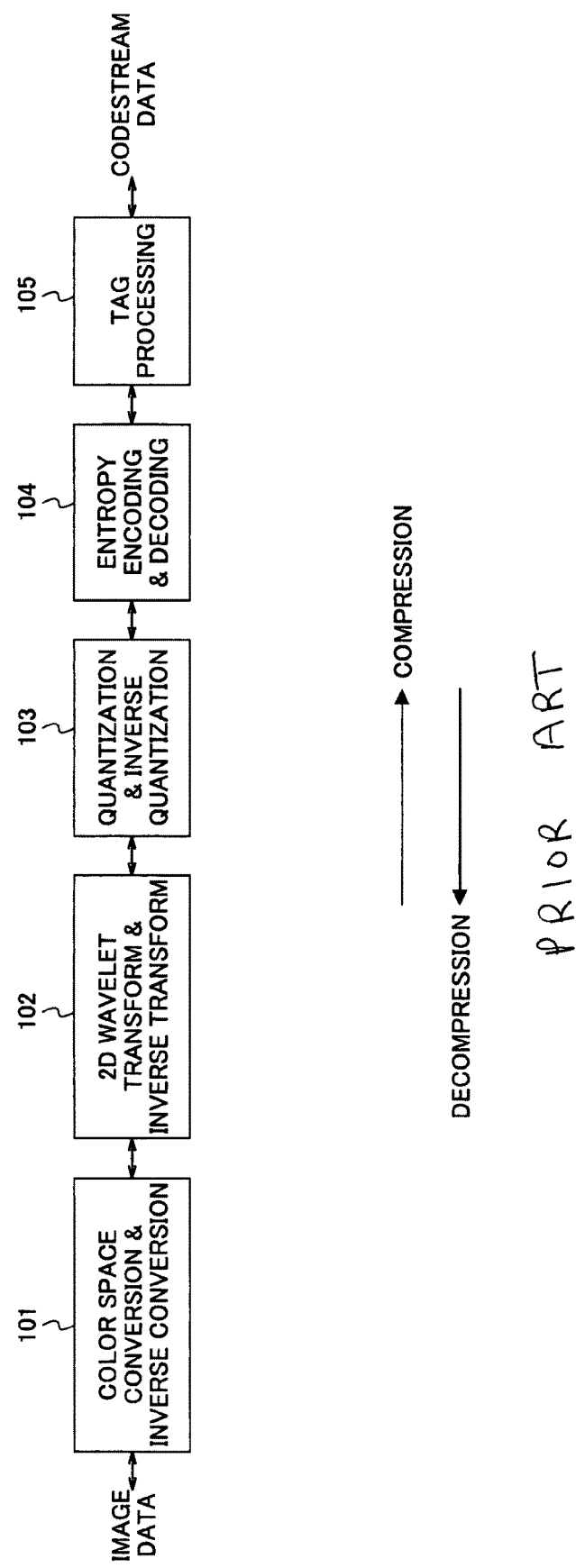
FIG. 1 is a functional block diagram showing a system realizing the hierarchical coding algorithm that forms the basis of JPEG2000, which an algorithm is a precondition for the present invention.

One embodiment of the present invention comprises a method of displaying a thumbnail image in which the above-described disadvantages are eliminated.

One embodiment of the present invention comprises a method of displaying a thumbnail image that can change the number of thumbnail images to be displayed on a screen in accordance with the format type of a data file and improve the visibility of the thumbnail image of a data file containing a document of a fixed format.

The above-described embodiments of the present invention may be achieved by a method of displaying a thumbnail image of an original image of a data file stored in a storage unit on a display unit, where the method includes storing in the storage unit a first compressed code relating to an image for displaying the thumbnail image of the data file, where the compressed code is generated by dividing the image into a plurality of tiles and performing discrete wavelet transform and hierarchical encoding on pixel values of the image tile by tile. The method also includes setting a resolution of the thumbnail image in accordance with a format type of the data file, extracting a second compressed code, according to the resolution that was set, from the first compressed code stored in the storage unit, and displaying the thumbnail image based on the second compressed code that was extracted.

According to the above-described method, the resolution of a thumbnail image to be displayed on the display unit is set in accordance with the format type of a data file, and resolution is freely selectable for a compressed code generated from an image divided into multiple tiles by performing DWT and hierarchical encoding on the pixel values of the image tile by tile. Accordingly, a compressed code according to the set resolution is extracted from the compressed code stored in the storage unit, and is displayed. As a result, it is possible to change the resolution of a thumbnail image in accordance with the format type of a data file as desired at the time of thumbnail display. This eliminates the necessity of storing multiple images dedicated to thumbnail display. Accordingly, it is possible to change the number of thumbnail images to be displayed on a screen in accordance with the format type of a data file without consuming a large memory capacity. Further, it is also possible to improve the visibility of the thumbnail image of a data file containing a document of a fixed format.

The above embodiments of the present invention may also be achieved by a server computer causing a thumbnail image of an original image of a data file stored in a storage unit of the server computer to be displayed on a display unit of a client computer in accordance with an instruction therefrom. The client computer is connected to the server computer via a network, and the server computer includes: a thumbnail image storage unit that stores in the storage unit a first compressed code relating to an image for displaying the thumbnail image of the data file, where the first compressed code is generated by dividing the image into multiple tiles and performing discrete wavelet transform and hierarchical encoding on pixel values of the image tile by tile. The server computer further includes a thumbnail image setting acquisition unit that acquires from the client computer a resolution of the thumbnail image, where the resolution is set in accordance with a format type of the data file, a thumbnail image extraction unit that extracts a second compressed code according to the resolution acquired by the thumbnail image setting acquisition unit from the first compressed code stored in the storage unit, and a thumbnail image transmission unit that transmits the second compressed code extracted by the thumbnail image extraction unit to the client computer.

According to the above-described server computer, the resolution of a thumbnail image to be displayed on the display unit set in accordance with the format type of a data file is acquired from the client computer, and resolution is freely selectable for a compressed code generated from an image divided into multiple tiles by performing DWT and hierarchical encoding on the pixel values of the image tile by tile. Accordingly, a compressed code according to the set resolution is extracted from the compressed code stored in the storage unit, and is transmitted to the client computer. As a result, it is possible to change the resolution of a thumbnail image in accordance with the format type of a data file as desired at the time of thumbnail display. This eliminates the necessity of storing multiple images dedicated to thumbnail display. Accordingly, it is possible to change the number of thumbnail images to be displayed on a screen in accordance with the format type of a data file without consuming a large memory capacity. Further, it is also possible to improve the visibility of the thumbnail image of a data file containing a document of a fixed format.

The above embodiments of the present invention may also be achieved by a client computer displaying a thumbnail image of an original image of a data file stored in a storage unit of a server computer on a display unit, where the server computer is connected to the client computer via a network, and the client computer including: a thumbnail image setting unit to set a resolution of the thumbnail image in accordance with a format type of the data file, and a thumbnail image setting transmission unit to transmit the resolution set by the thumbnail image setting unit to the server computer.

According to the above-described client computer, the resolution of a thumbnail image to be displayed on the display unit is set in accordance with the format type of a data file, and is transmitted to the server computer. Accordingly, the server computer, which acquires the resolution set in accordance with the format type of the data file, can extract a compressed code according to the set resolution from a compressed code stored in the storage unit and transmit the extracted compressed code to the client computer since resolution is freely selectable for a compressed code generated from an image divided into a plurality of tiles by performing DWT and hierarchical encoding on the pixel values of the image tile by tile.

The above-described embodiments of the present invention may also be achieved by a computer-readable recording medium storing a program for causing a server computer to execute a method of displaying a thumbnail image of an original image of a data file stored in a storage unit of the server computer on a display unit of a client computer in accordance with an instruction therefrom. The client computer is connected to the server computer via a network, the method includes acquiring from the client computer a resolution of the thumbnail image, where the resolution is set in accordance with a format type of the data file, extracting a first compressed code according to the resolution that was acquired from a second compressed code stored in the storage unit, where the second compressed code stored in the storage unit relating to an image for displaying the thumbnail image of the data file and is generated by dividing the image into multiple tiles and performing discrete wavelet transform and hierarchical encoding on pixel values of the image tile by tile, and transmitting the first compressed code that was extracted to the client computer.

The above-described embodiments of the present invention may further be achieved by a computer-readable recording medium storing a program for causing a client computer to execute a method of displaying a thumbnail image of an original image of a data file stored in a storage unit of a server computer on a display unit. The server computer is connected to the client computer via a network, and the method includes setting a resolution of the thumbnail image in accordance with a format type of the data file, and transmitting the resolution that was set to the server computer.

First, a description is given schematically of the "hierarchical coding algorithm" and the "JPEG2000 algorithm," which are the premises of the present invention.

FIG. 1 is a functional block diagram showing a system realizing the hierarchical coding algorithm that forms the basis of JPEG2000. This system includes a color space conversion and inverse conversion unit 101, a two-dimensional (2D) wavelet transform and inverse transform unit 102, a quantization and inverse quantization unit 103, an entropy encoding and decoding unit 104, and a tag processing unit 105.

One of the major differences between this system and the conventional JPEG algorithm is the transform method. JPEG employs the discrete cosine transform (DCT) while the hierarchical coding algorithm employs the DWT in the 2D wavelet transform and inverse transform unit 102. Compared with the DCT, the DWT enjoys the advantage of excellent image quality in a highly compressed region. This advantage is one of the major reasons the DWT is employed in JPEG2000, which is a successor algorithm to JPEG.

Another major difference is that the hierarchical coding algorithm additionally includes a functional block called the tag processing unit 105 at the final stage of the system for code formation. The tag processing unit 105 generates compressed data as codestream data at the time of image compression and interprets codestream data necessary for decompression at the time of image decompression. The codestream data allows JPEG2000 to realize a variety of convenient functions. For instance, the compression and decompression of a still image can be stopped freely at any hierarchy (decomposition level) corresponding to the octave division in the block-based DWT. This is described below with reference to FIG. 3. That is, a low-resolution part (a reduced image) can be extracted from a single file. Further, it is possible to extract part of an image (a tiling image).

The color space conversion and inverse conversion unit 101 is often connected to a unit for inputting and outputting an original image. For instance, a unit that converts the RGB colorimetric system made up of primary color system components of red (R), green (G), and blue (B) or the YMC colorimetric system made up of complementary color system components of yellow (Y), magenta (M), and cyan (C) to the YUV or YCbCr colorimetric system, or performs the inverse conversion thereof corresponds to the color space conversion and inverse conversion unit 101.

Next, a description is given of the JPEG2000 algorithm.

Figure 2:
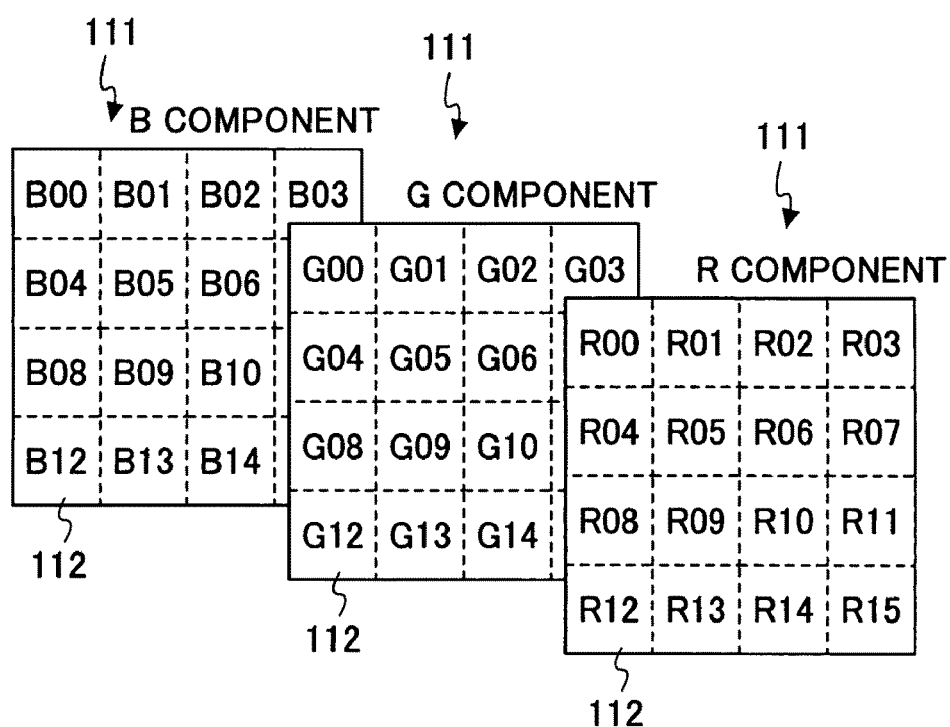
FIG. 2 is a diagram illustrating rectangular regions of each component of an original image according to JPEG2000.

Referring to FIG. 2, in a color image, generally, each of components 111 (RGB primary color system components in this case) of the original image is divided into rectangular regions 112 as shown in FIG. 2. Generally, the rectangular regions 112 are referred to as blocks or tiles. Since the rectangular regions 112 are generally referred to as tiles in JPEG2000, the rectangular regions 112 are hereinafter referred to as tiles. In the case of FIG. 2, each component 111 is divided into 16 (4×4) rectangular tiles 112. Each of the tiles 112 (R00, R01, ..., R15, G00, G01, ..., G15, B00, B01, ..., B15 in FIG. 2) becomes a basic unit in the process of compressing and decompressing image data. Accordingly, the compression and decompression of image data are performed independently for each component 111 and each tile 112.

In the case of encoding image data, the data of each tile 112 of each component 111 is input to the color space conversion and inverse conversion unit 101 and subjected to color space conversion. Thereafter, the data is subjected to 2D wavelet transform (forward transform) in the 2D wavelet transform and inverse transform unit 102 and spatially divided into frequency bands.

FIG. 3 is a diagram showing the sub-bands of each decomposition level in the case where the number of decomposition levels is three. That is, 2D wavelet transform is performed on the tile original image (0LL) of Decomposition Level 0 obtained by dividing the original image into tiles, so that the sub-bands (1LL, 1HL, 1LH, and 1HH) shown at Decomposition Level 1 are separated. Successively thereafter, 2D wavelet transform is performed on the low-frequency component of 1LL at this level so that the sub-bands (2LL, 2HL, 2LH, and 2HH) shown at Decomposition Level 2 are separated. Similarly, 2D wavelet transform is performed on the low-frequency component of 2LL so that the sub-bands (3LL, 3HL, 3LH, and 3HH) shown at Decomposition Level 3 are separated. In FIG. 3, the sub-bands to be subjected to encoding are indicated by hatching at each decomposition level. For instance, when the number of decomposition levels is three, the hatched sub-bands (3HL, 3LH, 3HH, 2HL, 2LH, 2HH, 1HL, 1LH, and 1HH) are to be subjected to encoding and the 3LL sub-band is not to be encoded.

Next, the target bits to be encoded are determined in a specified encoding order. Then, the quantization and inverse quantization unit 103 generates a context from the peripheral bits of each target bit.

Figure 4:
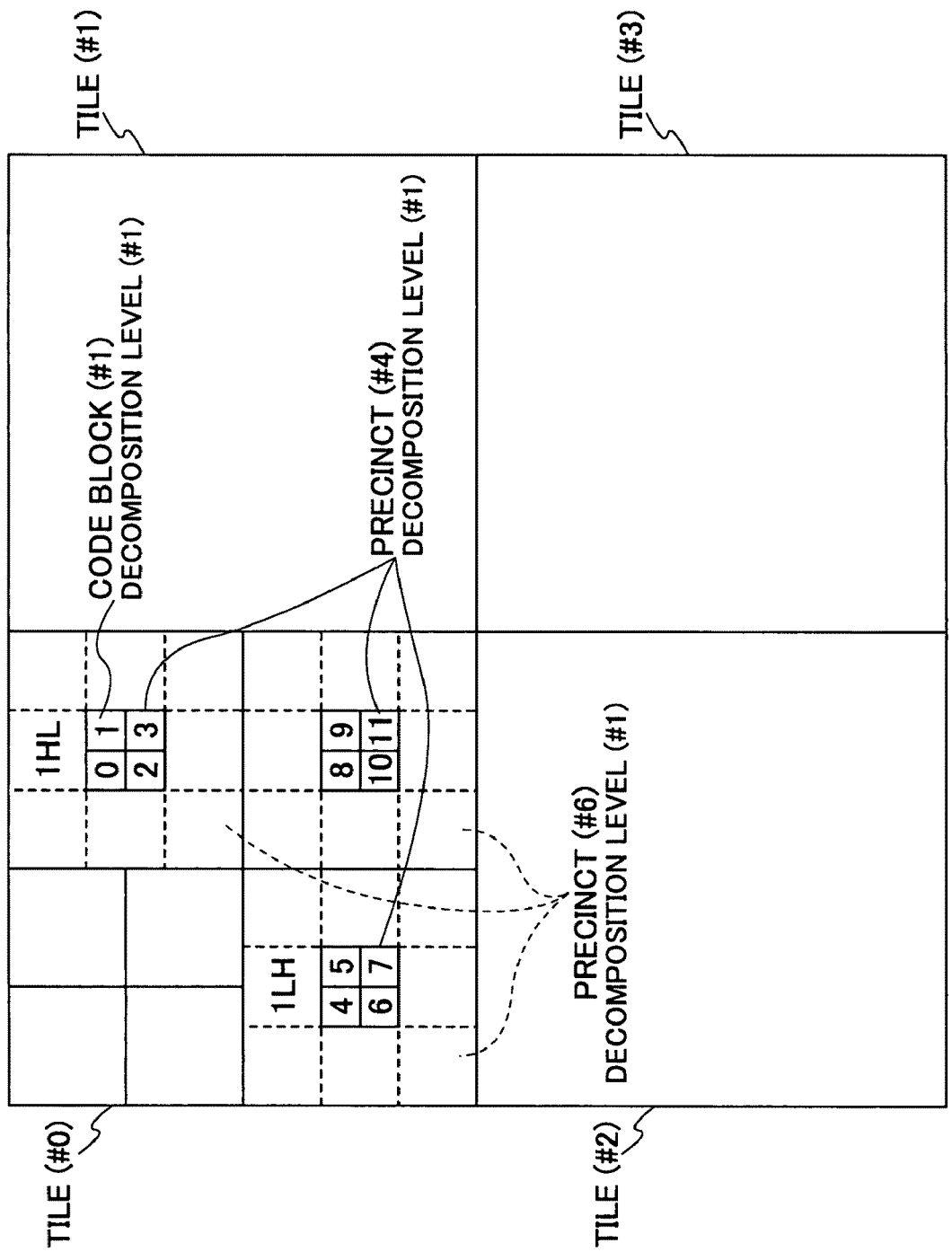
FIG. 4 is a diagram illustrating a precinct according to JPEG2000.

Sub-band by sub-band, the quantized wavelet coefficients are divided into non-overlapping rectangles called "precincts". The precincts are introduced for effective use of memory in implementation. Referring to FIG. 4, each precinct is composed of three spatially matching rectangular regions. Further, each precinct is divided into non-overlapping rectangular "code blocks." Each code block becomes a basic unit in performing entropy coding.

The coefficient values after the wavelet transform may directly be quantized and encoded. In order to improve coding efficiency, however, JPEG2000 decomposes the coefficient values into units called "bit planes," which may be placed in order in each pixel or code block.

Figure 5:
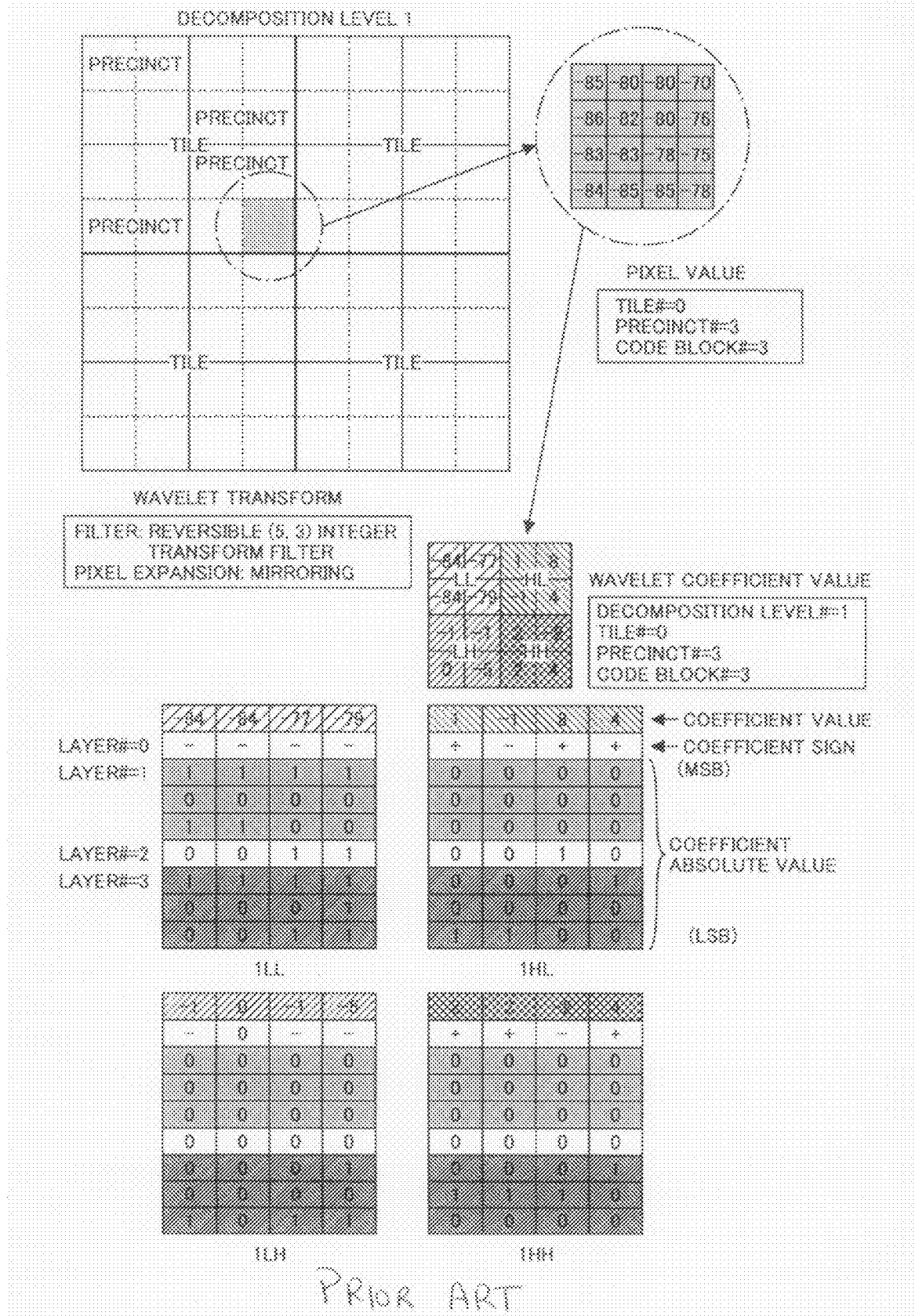
FIG. 5 is a diagram illustrating a process for placing bit planes in order according to JPEG2000.

FIG. 5 is a diagram for illustrating a process for placing the bit planes in order. In the case of FIG. 5, an original image of 32×32 pixels is divided into four tiles each of 16×16 pixels. Each precinct and each code block at Decomposition Level 1 are 8×8 and 4×4 pixels, respectively, in size. The precincts and the code blocks are respectively numbered according to raster scan order. In this case, the precincts are assigned numbers 0 through 3, and the code blocks are assigned numbers 0 through 3. A mirroring method is employed in pixel expansion beyond a tile boundary, and wavelet transform is performed with a reversible (5, 3) integer transform filter so that the wavelet coefficients of Decomposition Level I are obtained.

Further, FIG. 5 also shows a conceptual typical "layer" structure for Tile 0/Precinct 3/Code Block 3. Transformed Code Block 3 is divided into sub-bands (1LL, 1HL, 1LH, and 1HH), and the sub-bands are allocated their respective wavelet coefficient values.

The layer structure is easier to understand when the wavelet coefficient values are viewed horizontally along the bit planes. One layer is composed of an arbitrary number of bit planes. In this case, Layers 0, 1, 2, and 3 are composed respectively of one, three, one, and three bit planes. A layer including a bit plane closer to the LSB (least significant bit) bit plane is subjected to quantization earlier, and a layer including a bit plane closer to the MSB (most significant bit) bit plane is subjected to quantization later. The method of discarding a layer closer to the LSB bit plane first is called truncation, by which the rate of quantization is finely controllable.

The entropy encoding and decoding unit 104 of FIG. 1 performs encoding on the blocks 112 of each component 111 by probability estimation from the contexts and the target bits. Thus, encoding is performed block 112 by block 112 for each component 111 of the original image. Finally, the tag processing unit 105 connects all the coded data supplied from the entropy encoding and decoding unit 104 into a single coded data stream (codestream data), and adds a tag thereto.

Figure 6:
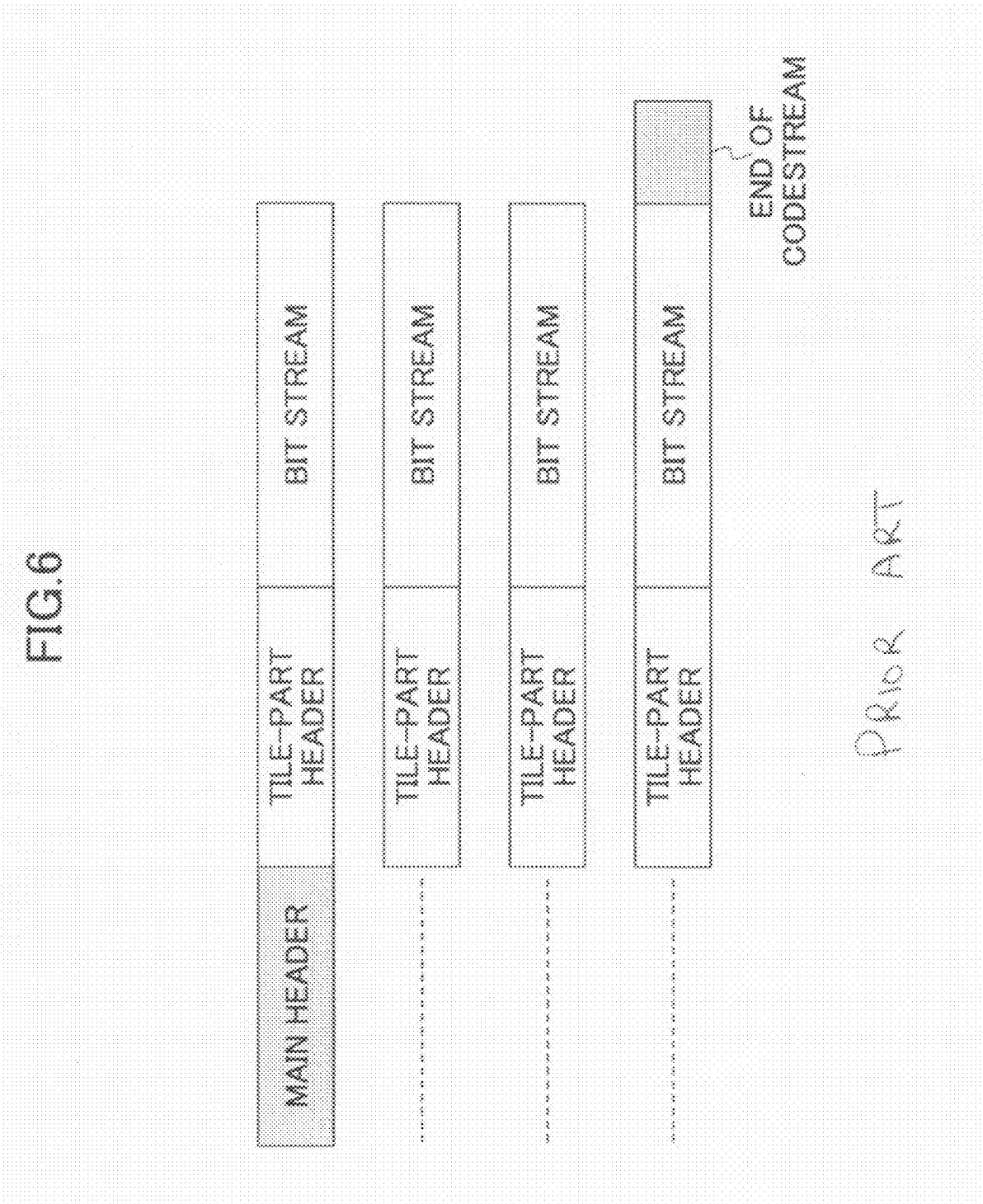
FIG. 6 is a schematic diagram showing a frame structure of code stream data according to JPEG2000.

FIG. 6 is a schematic diagram showing a frame structure of the code stream data. Tag information called a main header is added to the head of the codestream data, and tag information called a tile-part header is added to the head of the code data (bit stream) of each tile 112. Each tile-part header indicates a tile boundary position, and is followed by the code data of the corresponding tile 112. A coding parameter and a quantization parameter are written to the main header. Another tag (end of codestream) is added to the terminal end of the codestream data.

On the other hand, in the case of decoding coded data, image data is generated from the codestream data of the tiles 112 of the components 111 in the order reverse to that of the encoding of the image data. In this case, the tag processing unit 105 interprets the tag information added to the codestream data input from the outside. Then, the tag processing unit 105 decomposes the input codestream data into the codestream data of the tiles 112 of the components 111, and decodes (decompresses) the codestream data block 112 by block 112 for each component 111. At this point, the positions of the target bits to be subjected to the decoding are determined according to the order based on the tag information within the codestream data, and the quantization and inverse quantization unit 103 generates a context from the arrangement of the peripheral bits (already decoded) of the position of each target bit. The entropy encoding and decoding unit 104 performs decoding based on probability estimation from the contexts and the codestream data so as to generate the target bits, and writes the target bits to their respective positions. The thus decoded data is spatially divided into frequency bands. Therefore, each block 112 of each component 111 of the image data can be restored by subjecting the decoded data to 2D wavelet inverse transform in the 2D wavelet transform and inverse transform unit 102. The color space conversion and inverse conversion unit 101 converts the restored data to the image data of the original colorimetric system.

Next, a description is given with reference to FIGS. 7 through 17, of embodiments of the present invention. The following embodiments are based on an image compression and decompression technique represented by JPEG2000, but the present invention is not limited to the contents of the following description.

A description is given below of one embodiment of the present invention. In this embodiment, each of a server computer and a client computer performs image processing that is controlled by an image processing program installed therein or interpreted and executed thereby. In this embodiment, a storage medium storing such an image processing program is also described.

Figure 7:
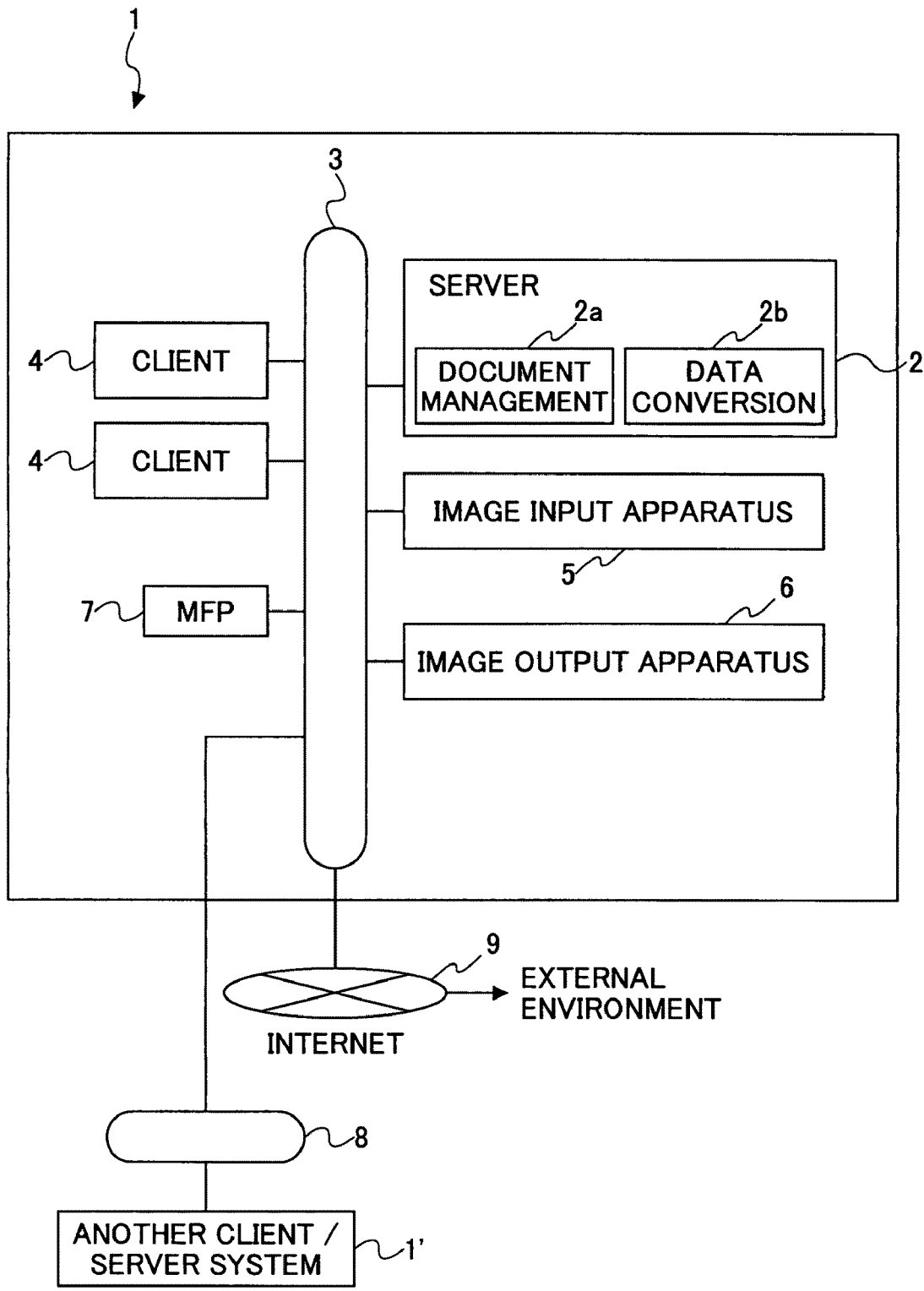
FIG. 7 is a diagram showing a configuration of an image data processing system according to one embodiment of the present invention.

FIG. 7 is a diagram showing a configuration of an image data processing system according to one embodiment of the present invention.

The image data processing system of one embodiment may be a client/server system 1 in which a plurality of client computers 4 are connected to a server computer 2 through a network 3 such as a local area network (LAN) 3.

According to the client/server system 1, an image input apparatus 5 such as a scanner or a digital camera and an image output apparatus 6 such as a printer can be shared on the network 3. Further, a multifunction peripheral (MFP) 7 is connected to the network 3. The system environment may be constructed so that the MFP 7 functions as the image input apparatus 5 and/or the image output apparatus 6.

The client/server system I is constructed so that data communications can be performed with another client/server system 1' via an intranet 8 and with an external environment via the Internet 9.

The server computer 2 includes a document management server 2a and a data conversion server 2b. The document management server 2a has the function of managing documents by storing the images of the documents as image data. The data conversion server 2b has the function of converting data. For instance, the data conversion server 2b extracts text data from image data by performing OCR (optical character recognition) processing on the image data.

Figure 8:
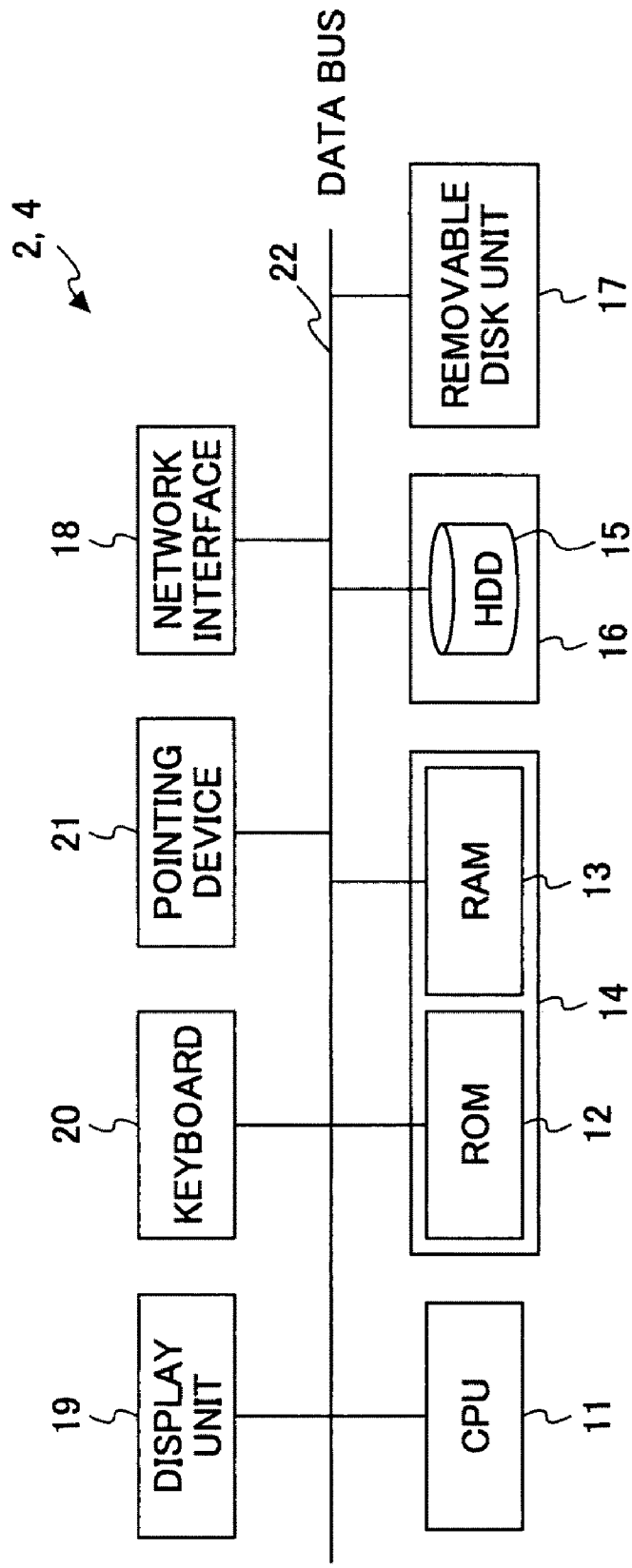
FIG. 8 is a module block diagram showing an image processing apparatus according to one embodiment of the present invention.

FIG. 8 is a module block diagram showing the server computer 2 and the client computer 4 as image processors.

Each of the server computer 2 and the client computer 4 includes: a CPU (central processing unit) 11 performing information processing; a primary storage device 14 including a ROM (read-only memory) 12 and a RAM (random access memory) 13 for storing information; a secondary storage device 16 including an HDD (hard disk drive) 15 as storage for storing image and document data files of various formats and a compressed code (described below); a removable disk unit 17 for storing information, distributing information to the outside, and obtaining information from the outside, such as a CD drive; a network interface 18 for communicating information with an external computer via the network 3; a display unit 19 displaying the progress and results of processing to an operator, such as a CRT (cathode ray tube) display or an LCD (liquid crystal display); and a keyboard 20 and a pointing device 21 such as a mouse for the operator to input commands and information to the CPU 11. Each of the server computer 2 and the client computer 4 operates with a bus controller 22 arbitrating data exchanged among these components.

According to this embodiment, the HDD 15 of the server computer 2 stores and retains compressed and encoded image data. The compressed and encoded image data is image data for displaying the image and document data files stored in the HDD 15 as thumbnail images. That is, the compressed and encoded image data is images dedicated to thumbnail display (thumbnail images). The compressed and encoded image data stored and retained in the HDD 15 of the server computer 2 is compressed codes generated in accordance with the JPEG2000 algorithm. Thereby, a thumbnail image storage unit is realized.

More specifically, when an image divided into rectangular regions (tiles) as shown in FIG. 9 is compressed and encoded, and the divided images (tiles) are arranged one-dimensionally, a compressed code having a configuration as shown in FIG. 10 is obtained. In FIG. 10, SOC indicates a marker segment that marks the start of a codestream, and MH indicates a main header storing values common to the entire codestream. The common values include, for instance, a vertical block size, a horizontal block size, a vertical image size, and a horizontal image size. The main header MH is followed by the coded data of the tiles. Referring to FIG. 10, the data obtained by compressing the tiles of FIG. 9 horizontally (in the main scanning direction) and vertically (in the sub scanning direction) in accordance with the tile numbers of FIG. 9 are arranged. An EOC marker positioned at the end of the compressed code of FIG. 10 is a marker segment that indicates the terminal end of the compressed code.

Figure 11:
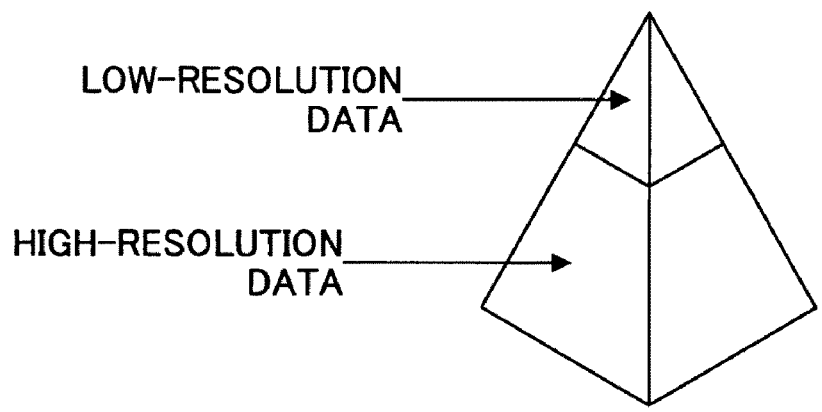
FIG. 11 is a diagram illustrating the resolution model of a compressed code generated in accordance with the JPEG2000 algorithm according to one embodiment of the present invention.

FIG. 11 is a diagram for illustrating the resolution model of a compressed code generated in accordance with the JPEG2000 algorithm. Referring to FIG. 11, it is possible to divide a compressed code generated in accordance with the JPEG2000 algorithm into low-resolution data and high-resolution data in a single image file. FIG. 11 shows only two types of resolutions. Actually, however, it is possible to extract compressed codes relating to multiple low-resolution parts of $½$, $¼$, $⅛$, $1/16$, ..., $½^n$ in accordance with the hierarchies (decomposition levels) corresponding to the octave division of the DWT, letting the entire data set be 1.

In each of the server computer 2 and the client computer 4, when power is turned on by a user, the CPU 11 activates a program called a loader in the ROM 12 and reads a program managing the computer hardware and software called an operating system (OS) from the HDD 15 into the RAM 13, activating the OS. The OS activates a program and reads and stores information in accordance with an operation by the user. Windows® and UNIX®, for instance, are well known as typical operating systems. An operation program that runs on the OS is referred to as an application program.

Each of the server computer 2 and the client computer 4 stores an image processing program as an application program in the HDD 15. In this sense, the HDD 15 functions as a storage medium storing the image processing program.

Generally, an application program recorded on an optical information recording medium such as a CD-ROM or a DVD-ROM or a magnetic medium such as an FD is installed in the secondary storage device 16 such as the HDD 15 of each of the server computer 2 and the client computer 4. Accordingly, a portable storage medium such as an optical information recording medium such as a CD-ROM or a magnetic medium such as an FD can be a storage medium storing the image processing program. Further, the image processing program may be read from the outside through the network interface 18 to be installed in the secondary storage device 16 such as the HDD 15.

In each of the server computer 2 and the client computer 4, when the image processing program that operates on the OS is activated, the CPU 11 performs operations in accordance with the image processing program to perform centralized control of the parts of the computer. Of the operations performed by the CPUs 11 of the server computer 2 and the client computer 4, a description is given of those characteristics of this embodiment.

Figure 12:
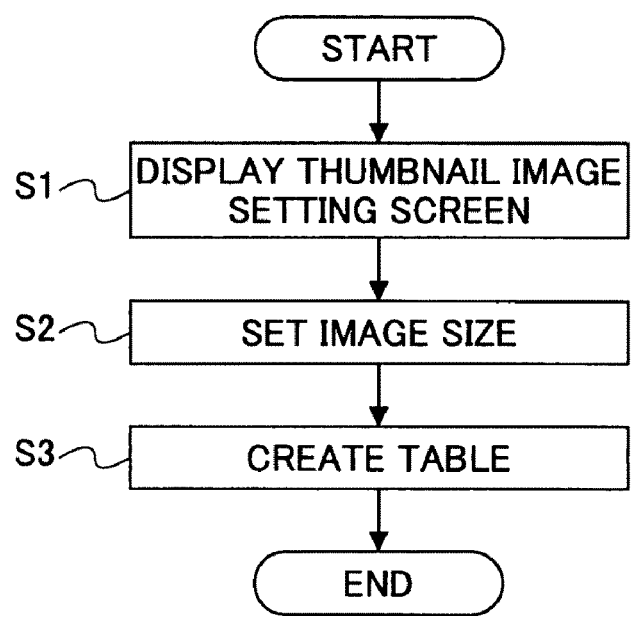
FIG. 12 is a flowchart of a thumbnail image setting operation according to one embodiment of the present invention.
Figures 13, 14:
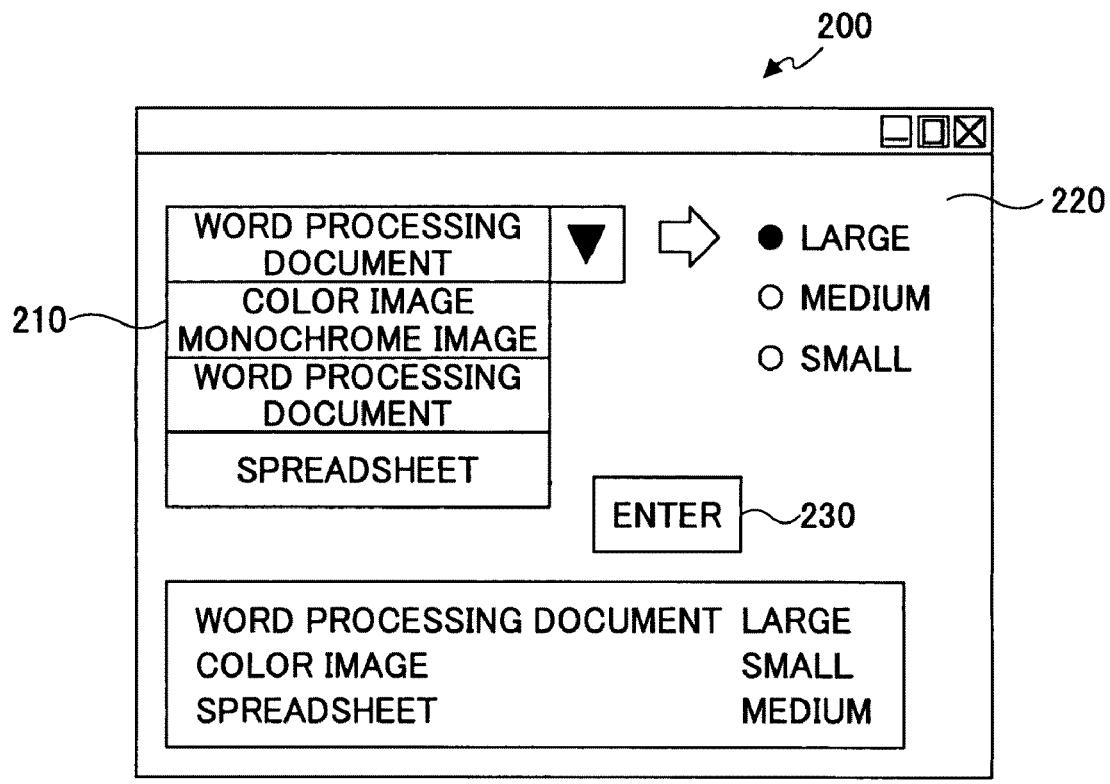
FIG. 13 is a diagram showing a thumbnail image setting screen displayed on a display unit according to one embodiment of the present invention.
FIG. 14 is a diagram showing a data structure of a thumbnail image setting table according to one embodiment of the present invention.

First, a description is given of a thumbnail image setting operation performed by the CPU 11 of the client computer 4. FIG. 12 is a flowchart of the thumbnail image setting operation. Referring to FIG. 12, first, in step S1, a thumbnail image setting screen 200 as shown in FIG. 13 is displayed on the display unit 19. The thumbnail image setting screen 200 includes a pull-down menu 210 for selecting the format type of a data file whose thumbnail image is to be displayed on the display unit 19. The thumbnail image setting screen 200 further includes radio buttons 220 for selecting the resolution of the thumbnail image to be displayed on the display unit 19 from three resolution levels of LARGE, MEDIUM, and SMALL. According to this embodiment, LARGE corresponds to a resolution of 256×256 pixels, MEDIUM corresponds to a resolution of 128×128 pixels, and SMALL corresponds to a resolution of 64×64 pixels. In step S2, an operator (a user who operates the client computer 4) operates the keyboard 20 or the pointing device 21, and selects the format type of a data file from the pull-down menu 210. Thereafter, the operator specifies one of the radio buttons 220, and operates an entry button (ENTER) 230. Thereby, the resolution of a thumbnail image to be displayed on the display unit 19 (a thumbnail image resolution) is set for each format type.

Next, in step S3, a thumbnail image setting table 300 as shown in FIG. 14 is created in the RAM 13 or the HDD 15 based on the thumbnail image resolutions thus set for the respective format types. As shown in FIG. 14, the thumbnail image setting table 300 correlates each data file format type with the corresponding thumbnail image resolution.

Thereby, the function of a thumbnail image setting unit setting the resolution of a thumbnail image to be displayed on the display unit 19 in accordance with the format type of a data file is performed.

Figure 15:
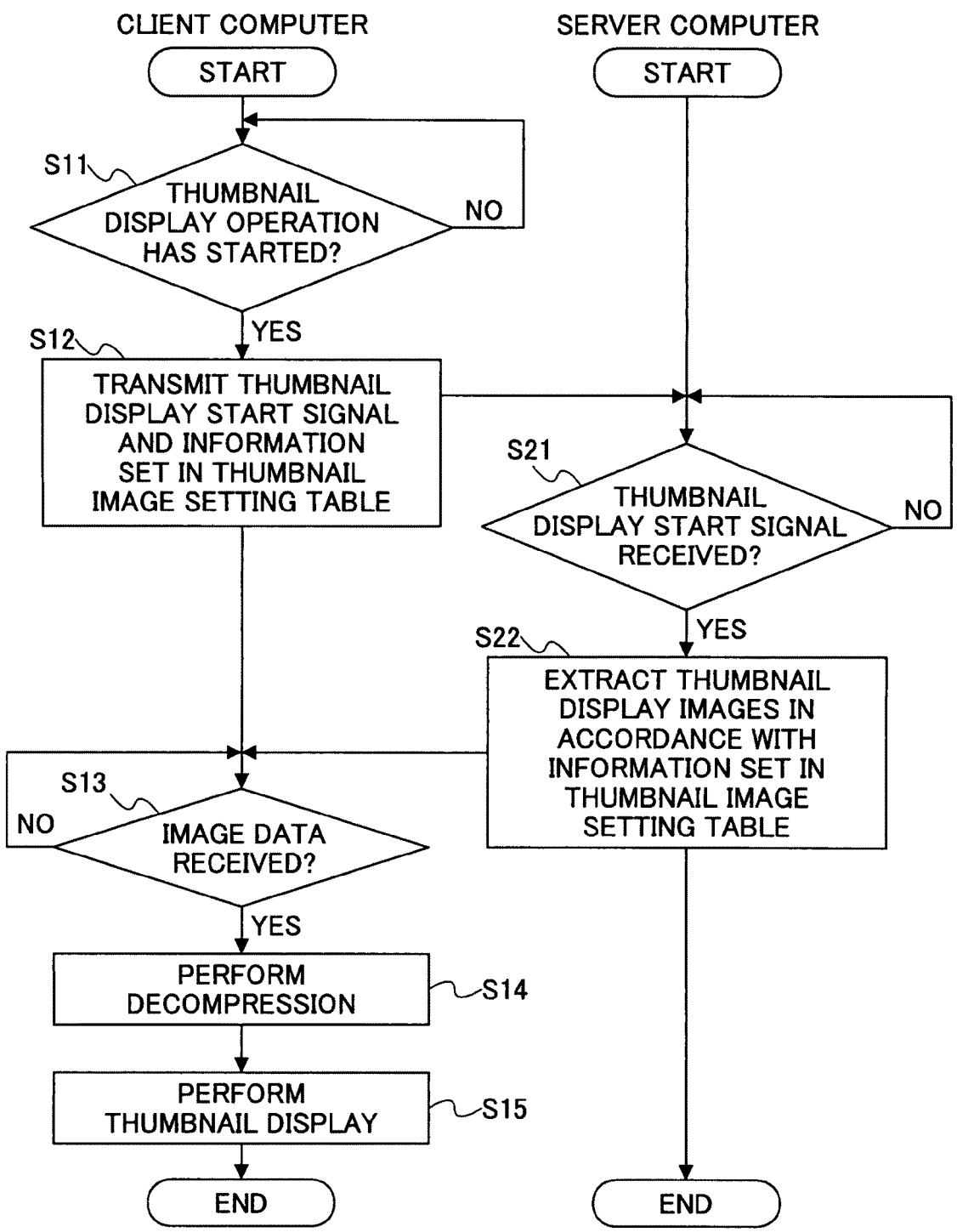
FIG. 15 is a flowchart of a thumbnail display operation according to one embodiment of the present invention.

Next, a description is given of a thumbnail display operation performed by the CPU 11 of the server computer 2 and the CPU 11 of the client computer 4. FIG. 15 is a flowchart of the thumbnail display operation. Referring to FIG. 15, in step S11, it is determined whether an operator (a user operating the client computer 4) has started the thumbnail display operation for a group of desired data files stored in the HDD 15 of the server computer 2 by operating the keyboard 20 or the pointing device 21. If the operator has started the thumbnail display operation (that is, "YES" in step S11), in step S12, a thumbnail display start signal, indicating the start of the thumbnail display operation, and the information (thumbnail image resolutions for the format types of the data files) set in the thumbnail image setting table 300 are transmitted to the server computer 2. The operation of step S12 corresponds to the thumbnail image setting transmission unit of the client computer 4.

Meanwhile, in step S21, the server computer 2 receives and acquires the thumbnail display start signal and the information set in the thumbnail image setting table 300. The operation of step S21 corresponds to the thumbnail image setting acquisition unit of the server computer 2. Then, in step S22, the server computer 2 extracts (generates) compressed codes from the compressed codes of the images dedicated to thumbnail display of the desired data files in accordance with the information set in the thumbnail image setting table 300, and transmits the extracted compressed codes to the client computer 4. The operation of step S22 corresponds to the thumbnail image extraction unit and the thumbnail image transmission unit of the server computer 2. As previously described, from a compressed code generated in accordance with the JPEG2000 algorithm, it is possible to extract compressed codes relating to multiple low-resolution parts of $½$, $¼$, $⅛$, $\frac{1}{16}, \ldots, \frac{1}{2}$" in accordance with the hierarchies (decomposition levels) corresponding to the octave division of the DWT.

Next, in step S13, it is determined whether the client computer 4 has received the compressed codes according to the information set in the thumbnail image setting table 300 from the server computer 2. If the client computer 4 has received the set information (that is, "YES" in step S1 3), in step S14, the client computer 4 decompresses (decodes) the received compressed codes. Then, in step S15, the client computer 4 displays a list of thumbnail images on the display unit 19 based on the decompressed compressed codes. That is, the client computer 4 performs thumbnail display. Decompression (decoding) of a compressed code in accordance with the JPEG2000 algorithm is described above in the explanation of the color space conversion and inverse conversion unit 101, the 2D wavelet transform and inverse transform unit 102, the quantization and inverse quantization unit 103, the entropy encoding and decoding unit 104, and the tag processing unit 105 shown in FIG. 1. Accordingly, a description thereof is omitted.

Figure 16:
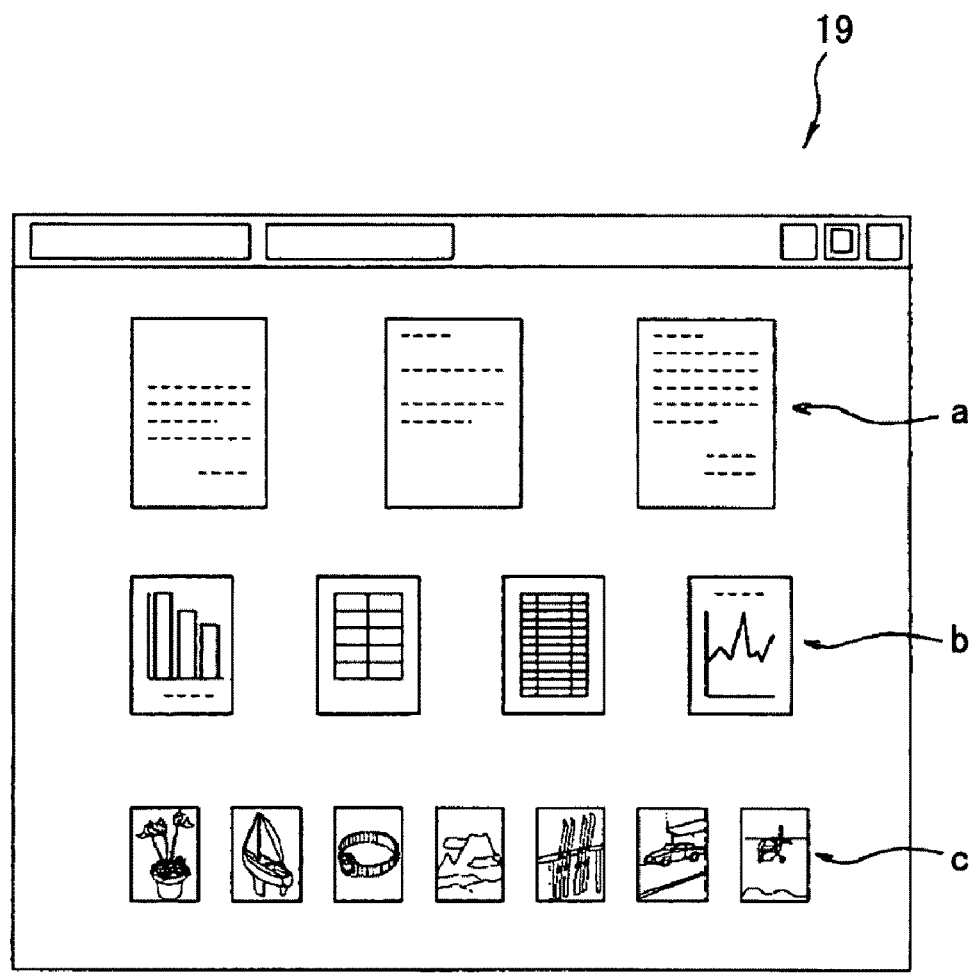
FIG. 16 is a diagram showing an example thumbnail display according to one embodiment of the present invention.

FIG. 16 is a diagram showing an example thumbnail display. As shown in FIG. 16, a list of thumbnail images (images dedicated to thumbnail display) according to the information (resolutions for the format types of the data files) set in the thumbnail image setting table 300 is displayed at the time of thumbnail display. As a result, in thumbnail display in a system where data files of various formats are mixed, it is possible to acquire an optimum display screen according to the format types of the data files. In the case of FIG. 16, a word processing document a is displayed in a large-size thumbnail image so that characters can be recognized easily. A spreadsheet b is displayed in a normal-size thumbnail image. A picture image c is displayed in a small-size thumbnail image that still allows the outline of the entire picture image c to be recognized.

Thus, the resolution of a thumbnail image to be displayed on the display unit 19 is set in accordance with the format type of a data file, and resolution is freely selectable for a compressed code generated from an image divided into multiple tiles by performing DWT and hierarchical encoding on the pixel values of the image tile by tile. Accordingly, a compressed code according to the set resolution is extracted from the compressed code stored in the HDD 15, which is a storage unit, and is displayed. As a result, it is possible to change the resolution of a thumbnail image in accordance with the format type of a data file as desired at the time of thumbnail display. This eliminates the necessity of storing multiple images dedicated to thumbnail display. Accordingly, it is possible to change the number of thumbnail images to be displayed on a screen in accordance with the format type of a data file without consuming a large memory capacity. Further, it is also possible to improve the visibility of the thumbnail image of a data file containing a document of a fixed format.

According to JPEG2000, it is possible to extract only the luminance component of an image. Accordingly, for instance, in step S22, the compressed codes transmitted from the server computer 2 to the client computer 4 may be those of only the luminance component. This is because even an image without color difference components allows the outline of the entire image to be recognized if the format type of a data file is a monochrome image or a monochrome word processing document. As a result, network traffic can be reduced. Whether the format type of a data file is a monochrome image or a color image is determined based on the contents of the file header of the data file.

Figure 17:
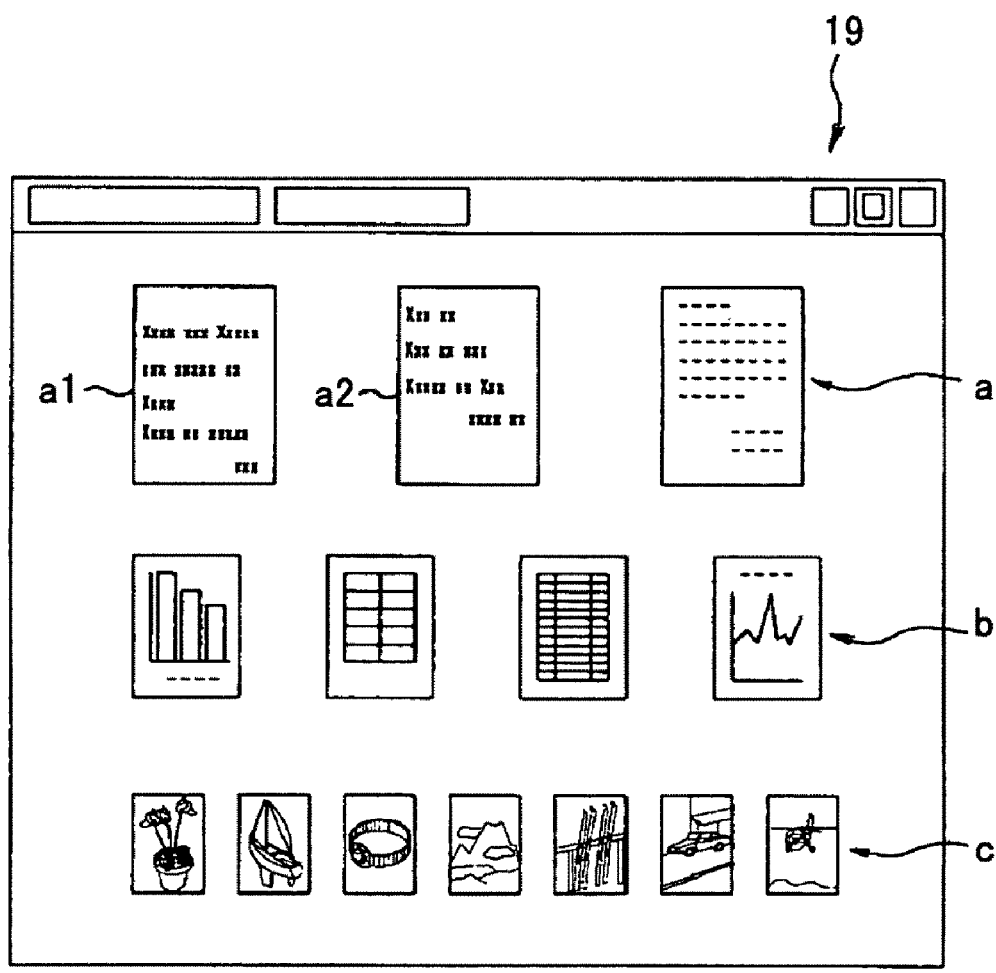
FIG. 17 is a diagram showing an example thumbnail display according to an embodiment of the present invention.

Next, a description is given, with reference to FIG. 17, of another embodiment of the present invention. The same elements as those of the above-described embodiment are referred to by the same numerals, and a description thereof is omitted. This embodiment is different from the above-described embodiment in the contents of the thumbnail display operation.

According to the JPEG2000 algorithm, it is possible to specify a region of interest (ROI) at the time of encoding. The ROI refers to part of the entire image which is cut out and enlarged or is highlighted relative to other parts. An ROI marker marking an ROI is added to a main header or a tile-part header. A tile of the ROI can be extracted based on the ROI marker.

Accordingly, in this embodiment, if the ROI is specified, it is possible to extract a tile of the ROI and apply the extracted tile as an image dedicated to thumbnail display. Therefore, according to one embodiment, in step S12 of FIG. 15, with respect to a data file including a specified ROI, the compressed code of a tile of the ROI of the image dedicated to thumbnail display is extracted in accordance with the information (resolutions for the format types of the data files) set in the thumbnail image setting table 300, and the extracted compressed code is transmitted to the client computer 4.

When the client computer 4 receives the extracted compressed codes from the server computer 2 (that is, "YES" in step S13 of FIG. 15), in step S14, the client computer 4 decompresses (decodes) the compressed codes. Then, in step S15, the client computer 4 displays a list of thumbnail images on the display unit 19 based on the decompressed compressed codes. That is, the client computer 4 performs thumbnail display. In the case of displaying only the tile of the ROI, the displayed image is enlarged to a certain size (for instance, to the size defined by the information set in the thumbnail image setting table 300 or a corresponding one of the resolutions for the format types of the data files) at the time of thumbnail display so that the thumbnail images of the data files of the same format type can be displayed in the same size. This improves the visibility of the thumbnail images of data files.

FIG. 17 is a diagram showing an example thumbnail display in the case of including image data having a specified ROI according to an embodiment. Referring to FIG. 17, word processing documents a1 and a2 have their respective ROIs displayed as images dedicated to thumbnail display (thumbnail images). This ensures understanding of the outline of a data file since the ROI of an image is understood to represent a characteristic part of the image.

The present invention is not limited to the specifically disclosed embodiments, and variations and modifications may be made without departing from the scope of the present invention.

The present application is based on Japanese priority application No. 2002-361734, filed on Dec. 13, 2002, the entire contents of which are hereby incorporated by reference.

What is claimed is:

1. A method of displaying a plurality of thumbnail images on a display unit, the method comprising:

(a) storing in a storage unit a plurality of first compressed codes relating to a plurality of images, each corresponding to one of a plurality of data files of different format types, wherein each of the plurality of first compressed codes being generated by dividing one of the plurality of images into a plurality of tiles and performing discrete wavelet transform and hierarchical encoding on pixel values of the one image tile by tile, wherein each thumbnail image is capable of being generated from one of the plurality of first compressed codes by extracting different portions of the one first compressed codes;

(b) setting a plurality of resolutions of the plurality of thumbnail images in accordance with the format types of the plurality of data files;

(c) extracting a plurality of second compressed codes according to the plurality of resolutions from the plurality of first compressed codes stored in the storage unit to select the plurality of thumbnail images with the plurality of resolutions, wherein steps (b) and (c) are performed by a computer; and (d) displaying, in a single view, the plurality of thumbnail images based on the plurality of second compressed codes, wherein the displayed thumbnail images have different resolutions corresponding to the format types of the plurality of data files.

2. The method of claim 1, wherein the plurality of data files include a text file and an image file, and a thumbnail image displayed in the single view for the text file has a display size larger than a display size of a thumbnail image displayed in the single view for the image file.

3. Server computer causing a plurality of thumbnail images to be displayed on a display unit of a client computer in accordance with an instruction therefrom, the client computer being connected to the server computer via a network, the server computer comprising:

a thumbnail image storage unit to store in a storage unit a plurality of first compressed codes relating to a plurality of images, each corresponding to one of a plurality of data files of different format types, wherein each of the plurality of first compressed codes being generated by dividing the one of the plurality of images into a plurality of tiles and performing discrete wavelet transform and hierarchical encoding on pixel values of the one image tile by tile, wherein each thumbnail image is capable of being generated from one of the plurality of first compressed codes by extracting different portions of the one first compressed codes;

a thumbnail image setting acquisition unit to acquire from the client computer a plurality of resolutions of the plurality of thumbnail images, the resolutions being set in accordance with the format types of the plurality of data files;

a thumbnail image extraction unit to extract a plurality of second compressed codes according to the plurality of resolutions acquired by the thumbnail image setting acquisition unit from the plurality of first compressed codes stored in the storage unit to select the plurality of thumbnail images with the resolutions; and a thumbnail image transmission unit to transmit the plurality of second compressed codes extracted by the thumbnail image extraction unit to the client computer, wherein the plurality of thumbnail images are displayed in a single view by the client computer based on the plurality of second compressed codes, and the displayed thumbnail images have different resolutions corresponding to the format types of the plurality of data files.

4. The server computer as claimed in claim 3, wherein when a region of interest (ROI) is specified with respect to each of the plurality of images, the thumbnail image extraction unit extracts the plurality of second compressed codes according to the plurality of resolutions set in the thumbnail image setting acquisition unit from part of each of the plurality of first compressed codes stored in the storage unit, the part of each of the plurality of first compressed codes relating to a tile of the ROI.

5. The server computer as claimed in claim 3, wherein the thumbnail image extraction unit extracts the plurality of second compressed codes from only a luminance component of the plurality of first compressed codes stored in the storage unit depending on the format types of the data files.

6. The server computer of claim 3, wherein the plurality of data files include a text file and an image file, and a thumbnail image displayed in the single view for the text file has a display size larger than a display size of a thumbnail image displayed in the single view for the image file.

7. A client computer displaying a plurality of thumbnail images of a plurality of images, each corresponding to one of a plurality of data files of different format types stored in a storage unit of a server computer on a display unit, the server computer being connected to the client computer via a network, the client computer comprising:

a thumbnail image setting unit to set a plurality of resolutions of the plurality of thumbnail images in accordance with the format types of the plurality of images, each format type being associated with one or more resolutions such that setting the resolution selects the plurality of thumbnail images from thumbnail images that may be generated from a plurality of first compressed codes related to the plurality of images and are stored in the storage unit; and a thumbnail image setting transmission unit to transmit the resolutions set by the thumbnail image setting unit to the server computer, wherein the plurality of thumbnail images are displayed in a single view by the client computer, and the displayed thumbnail images have different resolutions corresponding to the format types of the plurality of data files.

8. The client computer as claimed in claim 7, wherein in a case of receiving from the server computer a plurality of second compressed codes according to the resolutions set by the thumbnail image setting unit extracted from part of each of the plurality of first compressed codes stored in the storage unit, the part of each of the plurality of the first compressed codes relating to a tile of an ROI, the plurality of thumbnail images include one enlarged in accordance with the format type of the data file corresponding to the image related to the enlarged one.

9. The client computer of claim 7, wherein the plurality of data files include a text file and an image file, and a thumbnail image displayed in the single view for the text file has a display size larger than a display size of a thumbnail image displayed in the single view for the image file.

10. A computer-readable recording medium storing a program for causing a server computer to execute a method of displaying a plurality of thumbnail images of a plurality of images, each corresponding to one of a plurality of data files of different format types stored in a storage unit of the server computer on a display unit of a client computer in accordance with an instruction therefrom, the client computer being connected to the server computer via a network, the method comprising:

(a) acquiring from the client computer a plurality of resolutions of the plurality of thumbnail images, the plurality of resolutions being set in accordance with the format types of the plurality of data files;

(b) extracting a plurality of second compressed codes according to the resolutions from a plurality of first compressed codes stored in the storage unit to select the plurality of thumbnail images with the resolutions, wherein the plurality of thumbnail images are capable of being generated from the first compressed codes by extracting different portions of the first compressed codes, the first compressed codes relating to the plurality of images for displaying the plurality of thumbnail images and each being generated by dividing one of the plurality of images into a plurality of tiles and performing discrete wavelet transform and hierarchical encoding on pixel values of the one of the plurality of images tile by tile; and (c) transmitting the plurality of second compressed codes to the client computer, wherein the plurality of thumbnail images are displayed in a single view by the client computer, and the displayed thumbnail images have different resolutions corresponding to the format types of the plurality of data files.

11. The computer-readable recording medium as claimed in claim 10, wherein when an ROI is specified with respect to each of the plurality of images, a corresponding second compressed code is extracted according to a corresponding resolution from part of a corresponding first compressed code stored in the storage unit that is related to a tile of the ROI.

12. The computer-readable recording medium as claimed in claim 10, wherein the plurality of second compressed codes are extracted from only a luminance component of the plurality of first compressed codes stored in the storage unit depending on the format types of the data files.

13. The computer readable recording medium of claim 10, wherein the plurality of data files include a text file and an image file, and a thumbnail image displayed in the single view for the text file has a display size larger than a display size of a thumbnail image displayed in the single view for the image file.

14. A computer-readable recording medium storing a program for causing a client computer to execute a method of displaying a plurality of thumbnail images of a plurality of images, each corresponding to one of a plurality of data files of different format types, on a display unit, the client computer being connected to a server computer via a network, the method comprising:

(a) setting a plurality of resolutions of the plurality of thumbnail images in accordance with the format types of the plurality of images, each format type being associated with one or more resolutions, thereby selecting each of the plurality of thumbnail images from thumbnail images that may be generated from a plurality of first compressed codes related to the plurality of images and are stored in a storage unit; and (b) transmitting the resolutions set to the server computer, wherein the plurality of thumbnail images are displayed in a single view by the client computer, and the displayed thumbnail images have different resolutions corresponding to the format types of the plurality of data files.

15. The computer-readable recording medium as claimed in claim 14, wherein in a case of receiving from the server computer a plurality of second compressed codes according to the resolutions extracted from part of each of the plurality of first compressed codes stored in the storage unit, the part of each of the plurality of the first compressed codes relating to a tile of an ROI, the thumbnail images include one enlarged in accordance with the format type of the data file corresponding to the image related to the enlarged one.

16. The computer readable recording medium of claim 14, wherein the plurality of data files include a text file and an image file, and a thumbnail image displayed in the single view for the text file has a display size larger than a display size of a thumbnail image displayed in the single view for the image file.

* * * * *